United States Patent [19]

Joy et al.

[11] Patent Number: 5,188,062
[45] Date of Patent: Feb. 23, 1993

[54] AUTOMATIC LITTER BOX FOR SMALL ANIMALS

[76] Inventors: Gerald T. Joy, 129 Ashfield Dr., Brockton, Mass. 02402; Edla C. Wilson, III, 25 Crane St., Avon, Mass. 02322

[21] Appl. No.: 863,189

[22] Filed: Apr. 6, 1992

[51] Int. Cl.⁵ .............................................. A01K 29/00
[52] U.S. Cl. .................................................... 119/164
[58] Field of Search ............... 119/161, 163, 164, 165, 119/169, 170, 19

[56] References Cited

U.S. PATENT DOCUMENTS

| | | | |
|---|---|---|---|
| D. 314,254 | 4/1990 | Gordon | D30/162 |
| 3,071,110 | 1/1963 | Fox | 119/164 X |
| 3,793,988 | 2/1974 | Traeger | 119/164 |
| 4,011,837 | 3/1977 | Ksioszk | 119/164 |
| 4,205,869 | 7/1978 | Mathis | 294/1 B |
| 4,407,231 | 9/1981 | Colborn et al. | 119/1 |
| 4,465,018 | 8/1984 | Mopper | 119/164 X |
| 4,541,360 | 3/1984 | Higgins | 119/1 |
| 4,752,093 | 4/1987 | Haber et al. | 294/1.3 |
| 4,787,334 | 11/1988 | Bassine | 119/165 |
| 4,830,419 | 4/1987 | Watanabe | 294/1.3 |
| 5,033,780 | 11/1990 | Wootten | 294/1.3 |

FOREIGN PATENT DOCUMENTS

| | | | |
|---|---|---|---|
| 3534522 | 4/1986 | Fed. Rep. of Germany | 119/164 |
| 2648313 | 12/1990 | France | 119/165 |
| 8300980 | 8/1983 | World Int. Prop. O. | 119/164 |

*Primary Examiner*—Gene Mancene
*Assistant Examiner*—Thomas Price

[57] ABSTRACT

An automatic litter box for small animals, consisting of a litter package 37, a disposable litter container 23 for soiled litter, and an automatic litter box 1. The litter package 37 consists of alternating layers of litter 43 and clean paper layers 44 which is attached to the motorized rotational device 28 of the disposable litter container 23. When the litter is soiled by the small animal an electrical sensing device 12 starts the time delay sequence and after the animal leaves the automatic litter box 1 the soiled litter is moved by a motorized rotational device 28 into the disposable litter container 23. When the reflective material 41 is placed in a predetermined location on the clean paper layer 44 of the litter package 37 is reached an electrical sensing device 14 stops the motorized rotational device 28 and the cycle is ready to be repeated.

The automatic litter box 1 is of sufficient size to furnish clean litter and to store soiled litter for a period of five to seven days. After this time period is over the disposable litter container 23 is removed by lifting the convenient hinged cover 9 of the storage compartment 16 and removing the disposable litter container 23 by use of a carrying handle 30. When the container 23 is removed, the sealing material sheet 32 is placed over the through wall opening 26, and is connected to the self adhesive strips 24 sealing the container 23 for proper disposal.

4 Claims, 5 Drawing Sheets

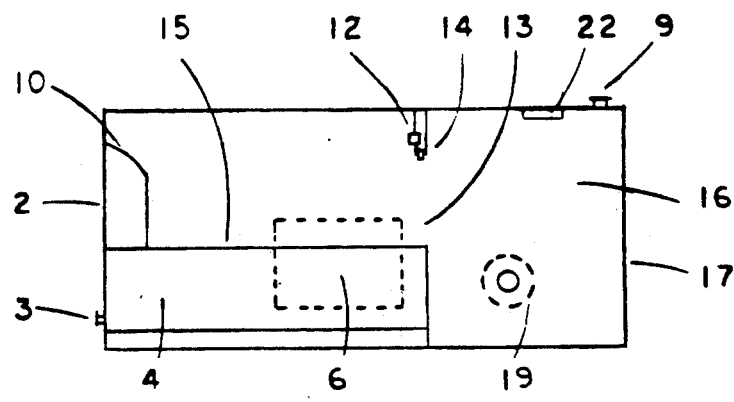
FIG IB
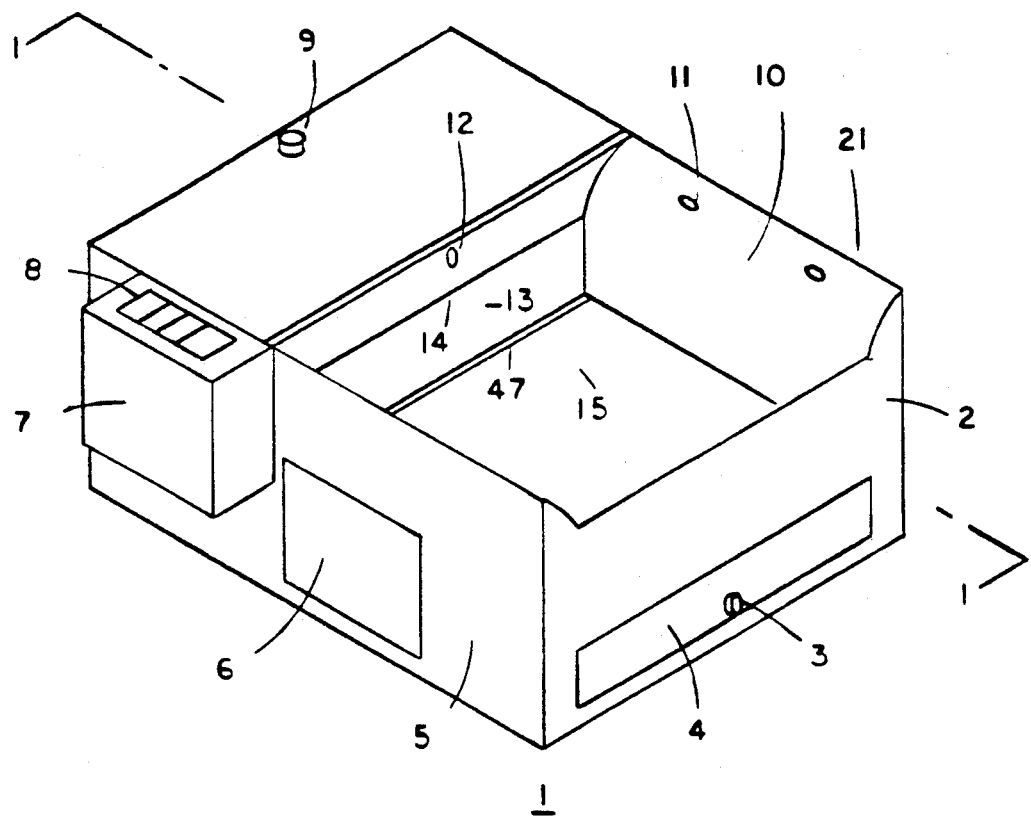
FIG IA

37

37

AUTOMATIC LITTER BOX FOR SMALL ANIMALS

BACKGROUND

1. Field of Invention

This invention relates to litter boxes, specifically to such boxes which are used for the storage and disposal of solid and liquid wastes produced by small animals.

2. Description of Prior Art

The Pet Industry commonly supplies consumers with various forms of litter boxes used for the containment of pet wastes. Such boxes are filled with various amounts of litter (ground clay) with additives for smell and absorbency to provide a place for the small animals to relieve themselves. The odor from the boxes and the daily maintenance of removing the small animal wastes have consumers looking for a better way.

Inventors have created several types of litter and litter boxes that have improved the odor and disposal problems however they are limited to daily use. Higgins U.S. Pat. No. 4,541,360 (1984) discloses a disposable litter box that has a formed removable top and sides that can support an animal during use. The removable top can be repositioned for disposal. This use of this box is typical of most litter boxes where they require manual cleaning or disposal after each use and provide no odor control. Colborn, Coyne, Emrie and Monk U.S. Pat. No. 4,407,231 (1981) for a clay material impregnated with a crystal which when scratched or wet will give off a pleasant aroma. This is fine for odor control but waste removal is still a daily chore. Gordon U.S. Pat. No. D314,254 (1990) shows a hand held scoop with elongated slots to allow litter to fall through while still containing the waste material. This manual device is used daily for the removal of waste.

The several types of litter boxes and litter material known in use today suffer from a number of disadvantages:

(a) The main component of the litter box is litter. The soiled litter has to be removed and replenished daily. In some cases the litter must be replaced after each use or the small animal will not use the box. The result is a dirty carpet or floor.

(b) Litter boxes require the use of a scoop or spoon to remove the waste material left by the small animal. This is a job most owners do not relish.

(c) Litter boxes need daily maintenance and this may be required during any time of the day or night. The resulting odor of a deposit can stop any party or any household activity fast.

(d) A weekend trip would require the use of a kennel or taking your small animal along which may be an inconvenience.

(e) Toxoplasmosis an infection of mammals, birds and reptiles that is also common in humans and is especially dangerous for pregnant women, can be transmitted by breathing contaminated dust particles from litter or handling soiled litter and cat feces during daily maintenance of the litter box.

(f) Cleaning of the sides of the litter box to remove any traces of waste must be done after each use.

OBJECTS AND ADVANTAGES

Several objects and advantages of the present invention are:

(a) To provide an automatic care free litter box system with new litter after each use along with the disposal of the soiled litter.

(b) To provide a disposable container for the safe and odor free storage of soiled litter and waste for a period of (5) to (7) days.

(c) To provide a litter package containing layers of litter on an absorbent material with a backing of fine plastic having extended sides that attach to the walls of the litter box thus providing protection against waste material getting on the walls or the next layer of litter.

(d) To provide a litter box that will house the disposable container and litter package.

(e) To provide a litter box having a sensor that will detect the presence of a small animal and activate a time sequence when the small animal leaves the box, causing a motorized rotation device to move the soiled litter into the disposable container. The operation will be stopped when a sensor detects a predetermined location on the litter package.

(f) To provide a litter box that will require no handling of exposed waste material other than the convenient disposal of the container of soiled litter.

Further objects and advantages are to provide a system which can be used easily and conveniently to furnish clean fresh litter automatically any time of the day and night and dispose of waste material in the same manner. This will allow the owner the freedom to take that weekend trip with the knowledge that his small animal and home are being taken care of.

DRAWING FIGURES

In the drawings, closely related figures have the same number but different alphabetic suffixes, FIG. 1A is a perspective view of the litter disposal system.

FIG. 1B is a cross-sectional view of line 1—1 of FIG. 1A.

REFERENCE NUMERALS IN DRAWINGS

Figure 2B:
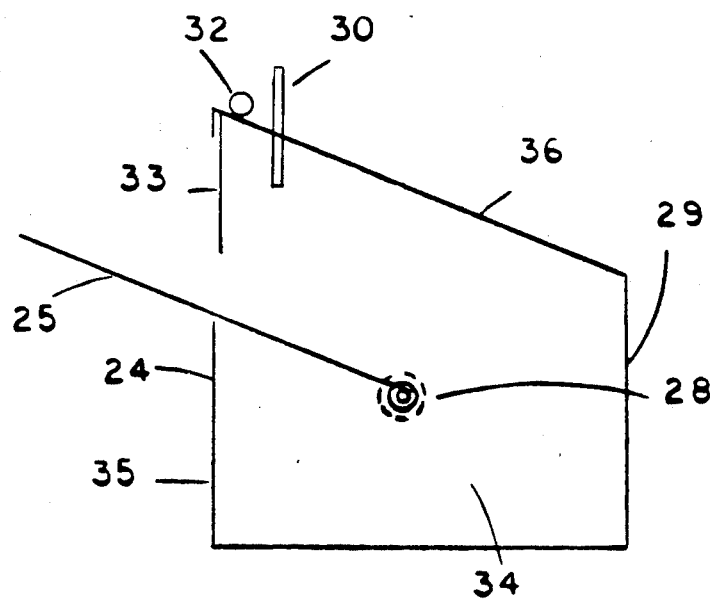
FIG. 2B is a cross sectional view of line 2—2 of FIG. 2A.

| | |
|---|---|
| 1 automatic litter box | 2 front panel |
| 3 hinged cover for storage space | 4 storage space |
| 5 left side panel | 6 electronics compartment |
| 7 motor compartment | 8 electric controls |
| 9 hinged top cover | 10 curved inside wall |
| 11 litter package attachment knob | 12 electronic start sensor |
| 13 panel | 14 electronic stop sensor |
| 15 litter compartment | 16 disposable litter compartment |
| 17 back panel | 18 mechanical spring |
| 19 motor | 20 power supply |
| 21 right side panel | 22 odor control device |
| 23 disposable litter container | 24 adhesive strip |
| 25 attachment paper | 26 through wall opening |
| 27 left side panel | 28 motorized rotational devise |
| 29 back panel | 30 carrying handle |
| 31 right side panel | 32 sealing material |

-continued

| | |
|---|---|
| 33 interior curtain | 34 moisture proof interior |
| 35 front panel | 36 sloped top |
| 37 litter package | 38 absorbent paper |
| 39 protective plastic | 40 sealed plastic support |
| 41 protective plastic extension layer | 42 perforated strip |
| 43 litter section | 44 clean section |
| 45 first layer | 46 starting layer |
| 47 self sealing material | 48 plastic base |

DESCRIPTION—FIGURES 1 TO 3

A typical embodiment of the automatic litter box 1 of the present invention is illustrated in FIG. 1a (isometric view) and FIG. 1b (sectional). The box has a front panel 2 with a contoured top and a hinged cover 3 for an enclosed storage compartment 4 which can be used for a litter package 37 or other pertinent material. The right and left sides of the front panel 2 are equal in height to the right side 21 and the left side 5 of the box.

The left side 5 of the box supports the cover to the electronic compartment 6 which is contained between the left side 5 and the contoured wall 10. The motor compartment 7 is attached to the left side 5 and contains the motor. The top portion of the motor compartment 7 contains the electric controls 8 for the automatic litter box 1. The left side 5 is equal in height to the back panel 17.

A panel 13 with a through wall opening separates the litter package section 15 with the disposable litter container compartment 16. This panel 13 contains the electronic start sensor 12 on the front portion of the panel facing the litter compartment 15. The electronic stop sensor 14 is located in the base of panel 13 and faces the base of the litter compartment 15. This panel 13 is constructed to have an interior large enough to contain the electronic start sensor 12, electronic stop sensor 14 and the wiring to the electronic compartment 6.

Figure 3B:
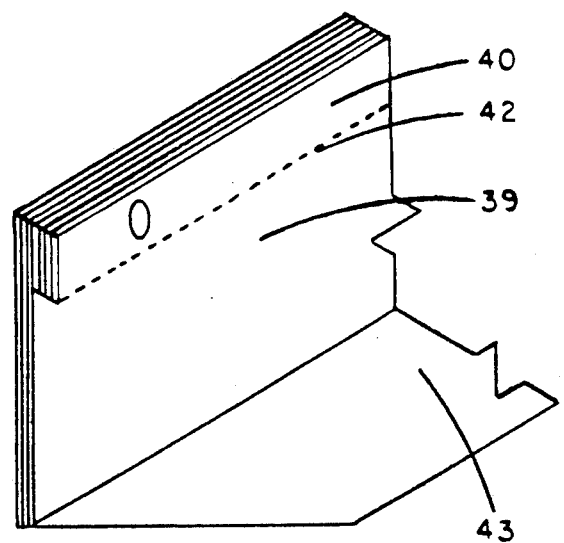
FIGS. 3A and 3B are general views of the single litter sheet.

There are two litter package attachment knobs 11 located on each of the three contoured interior sides 10 which will hold the sealed plastic support 40 of the litter package 37 (FIG. 3b).

The disposable litter compartment 16 is constructed in length, width, and height to be of sufficient size to facilitate the convenient installation and removal of the disposable litter container 23 (FIG. 2a) through the hinged cover 9 opening of the disposable litter compartment 16. Attached to the interior side of the hinged cover 9 an odor control device 22 is located.

Various types of material can be used for the construction of the automatic litter box 1. The preferred type would be plastic for its strength, weight and ease of cleaning and maintenance. However many types of wood and metal with a proper protective finish coating would be suitable.

The size of the automatic litter box 1 should be of sufficient length, width and height to accommodate the fresh litter supply and the proper storage of soiled litter required for the duration of five to seven days.

Figure 2A:
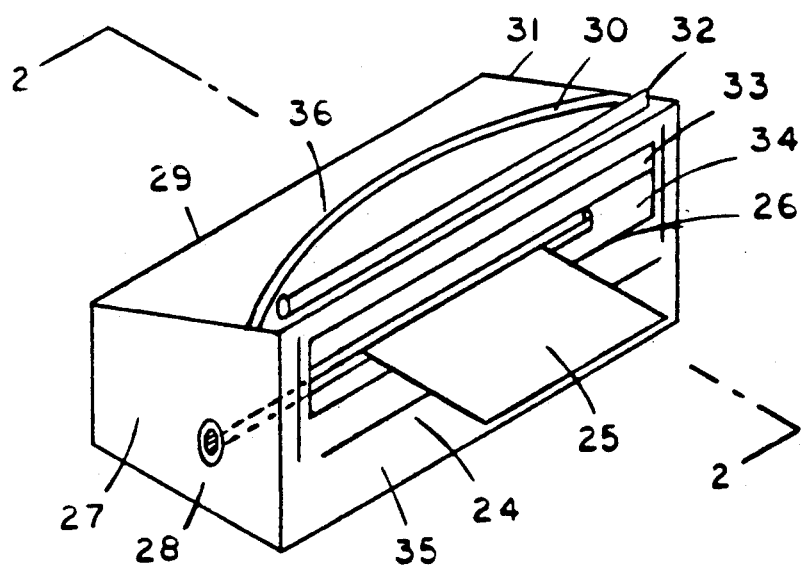
FIG. 2A is a perspective view of the disposable litter compartment.

As shown in FIG. 2a (isometric) and FIG. 2b (sectional). The disposable litter container front panel 35 contains a longitudinal through wall opening 26 which allows the attachment paper 25 to pass through and connect to the first sheet 46 of the litter package 37 (FIG. 3d). An interior curtain 33 is secured to the top of the inside of the front panel 35 to block the view of the soiled litter. There are three adhesive strips 24 attached to the face of the front panel 35. When the non adhesive protective cover is removed from the adhesive strips 24, the through wall opening sealing material 32 is unrolled and attached to the adhesive strips 24 to seal the through wall opening 26 closed.

On the left side 27 a motorized rotational devise 28 is attached to the exterior of the left side 27 and passes through a hole in the left side panel 27 and travels the length of the moisture proof interior 34 to attach to the interior side of the right panel 31. The attachment paper 25 is adhered to the motorized rotational device 28 and passes through the opening 26 of the front panel 35.

A carrying handle 30 passes through the edge of the sloped top 36 and is attached to the interior sides of the left panel 27 and the right panel 31.

The front panel 35 is equal in height to the right side of the left panel 27 and the left side of the right panel 31. The back panel 29 is equal in height to the left side of the left panel 27 and the right side of the right panel 31. The back panel 29 is greater in height than the bottom of the longitudinal opening 26 in the front panel 35. From the top of the front panel 35 to the top of the back panel 29 will form the sloped top 36 of the box.

Figure 3A:
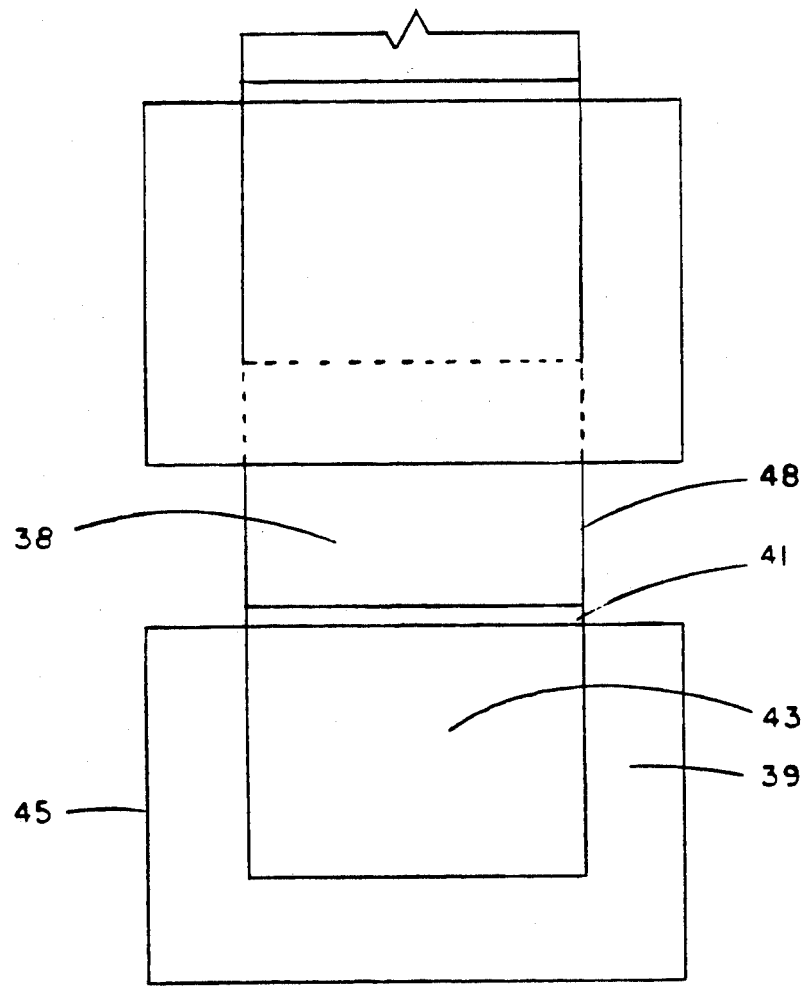
Figure 3D:
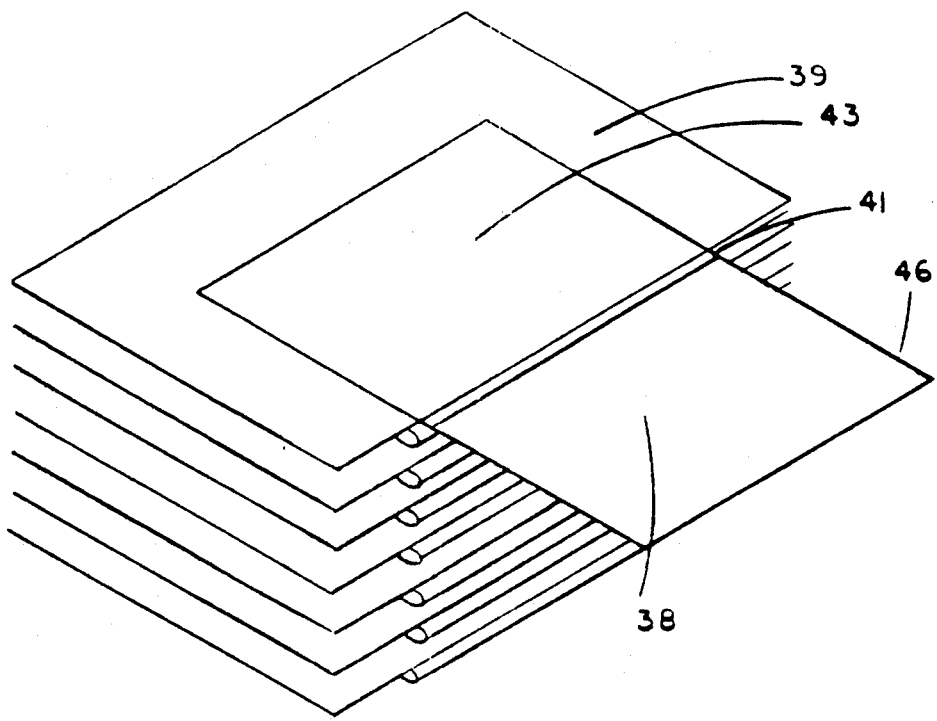
FIGS. 3C and 3D are perspective views of the foldedly stacked litter layers.

In FIG. 3a (top view) the litter package 37 is shown prior to being folded. This litter package 37 is sized to fit firmly into the litter compartment 15 of the automatic litter box 1. The entire length of the litter package 37 consists of a base 48 of a thin layer of plastic to which an absorbent paper 38 is adhered. A second layer consisting of an absorbent paper 38 adheres to a section of plastic which forms a protective layer 39. This protective plastic layer 39 adheres to the top portion of the base 48. This protective plastic layer 39 is applied in an alternating pattern with equal spacing in between.

A litter material is now placed on the top of the absorbent paper 38 of the plastic protective layer 39, this now forms the litter section 43 of the litter package 39. A reflective material 41 is placed on the base 48 of the litter package 37 at a predetermined location in the equal space between the alternating pattern of the protective plastic layer 39, this equal space forms the clean section 44 of the litter package 37.

In FIG. 3b (isometric view) shows the detail of the sealed plastic support 40 connected to the litter attachment knob 11. This support 40 serves two purposes, first for keeping the protective plastic extension later 39 in place and secondly to keep a tension on the litter section 43 which was soiled and is now being deposited into the disposable litter container. Each protective plastic extension layer 39 is perforated along the edge where it is sealed to form the sealed plastic support 40. The last protective plastic extension layer 39 is not perforated when it is sealed to form the sealed plastic support 40. This layer is made stronger than the rest so that when the last layer is being deposited into the disposable container 23 it will cause the remaining portion of the sealed plastic support 40 to be torn from the litter container 23 leaving the automatic litter box 1 completely clean of all material.

Figure 3C:
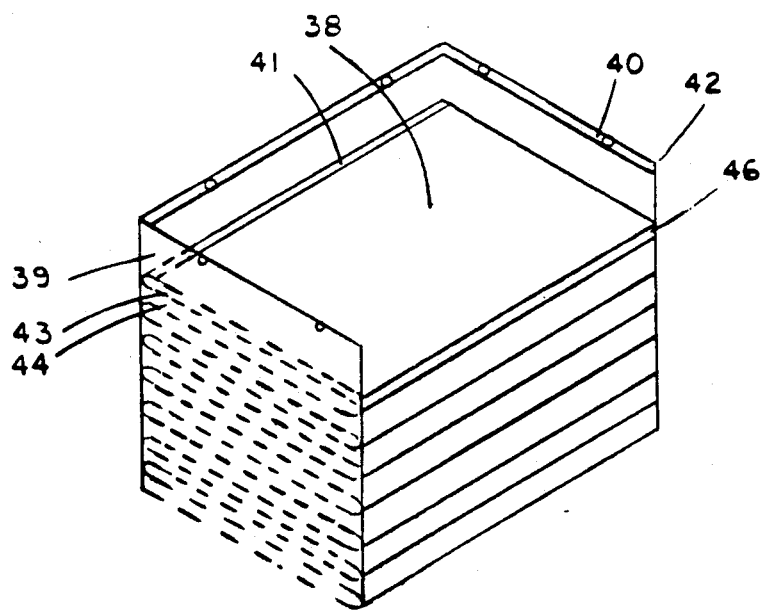

In FIG. 3c (isometric view) the litter package 37 is shown folded starting with a litter section 43 then covered with a clean section 44. This process is repeated until a completed litter package 37 containing an equal number of litter sections 43 covered by an equal number of clean sections 44. The extended sections of protective plastic layer 39 are folded in an upright position and are sealed together to form a protective seal between each litter section 43 so that all waste material will remain on the litter section deposited on.

In FIG. 3d (isometric view) the litter package 37 is shown folded and with the protected plastic extension layer 39 lying flat to show detail of the starting layer 46, the reflective material 41, and the litter section 43.

From the description above, a number of advantages of our automatic litter box become evident:

(a) The automatic litter box will provide a continuous supply of fresh litter for a period of five to seven days.

(b) With the use of the litter package, daily supplement of litter will not be required as they are in other litter boxes.

(c) The disposable litter container eliminates the daily removal of soiled litter with the safe and odor free storage of soiled litter for five to seven days.

(d) All of the materials used in the manufacture of the components used the automatic litter box system are in common use today and can be made from recycled materials.

(e) Prolonged absence from the home is now viable knowing your pet is being taken care of in your absence.

OPERATIONAL—FIGURES 1, 2, 3, 4

Figure 4B:
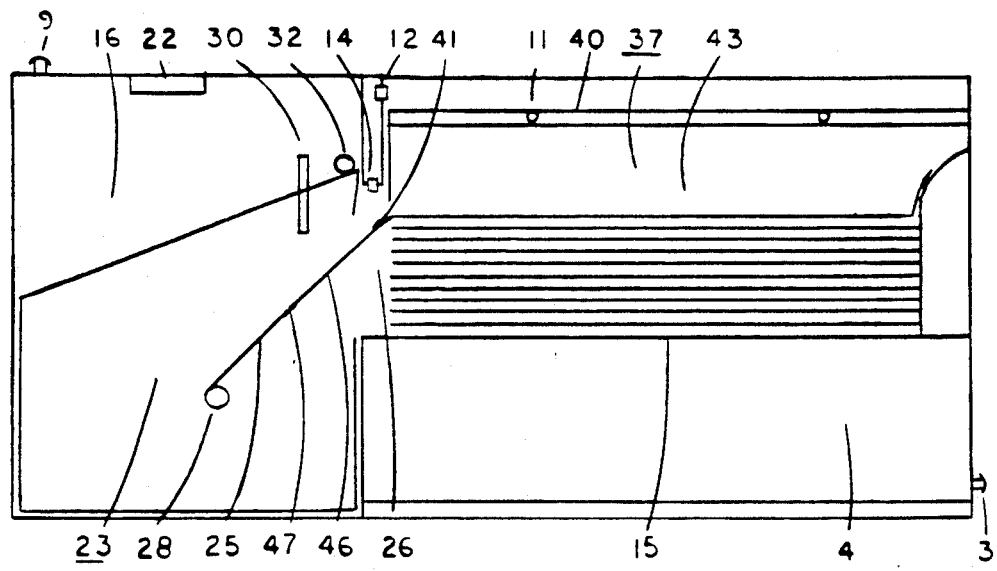
FIGS. 4A and 4B are views of the plurality of litter layers foldedly stacked within the litter compartment.

The manner of using the automatic litter box (FIG. 1a) for the supply of fresh litter and the removal of soiled litter, one first places the litter package component 37 (FIG. 3c) into the litter compartment 15 and attaches the sealed plastic support 40 to the litter package attachment knob 11 (FIG. 4b).

One then places the disposable litter container 23 (FIG. 2a) into the disposable litter container compartment 16 by lifting the convenient hinged top cover 9. When the disposable litter container 23 is in the box you slide it a little to the left to engage the motor 19 drive unit. The box is held in place by a mechanical spring 18 which applies enough pressure to hold the box in position (FIG. 4a).

When the disposable litter container 23 is in place you take the attachment paper 25 through the longitudinal through wall opening 26 and attach it to the starting layer 46 by removing the top protective layer of the self sealing material 47 on the attachment paper 25 (FIG. 4b).

Figure 4A:
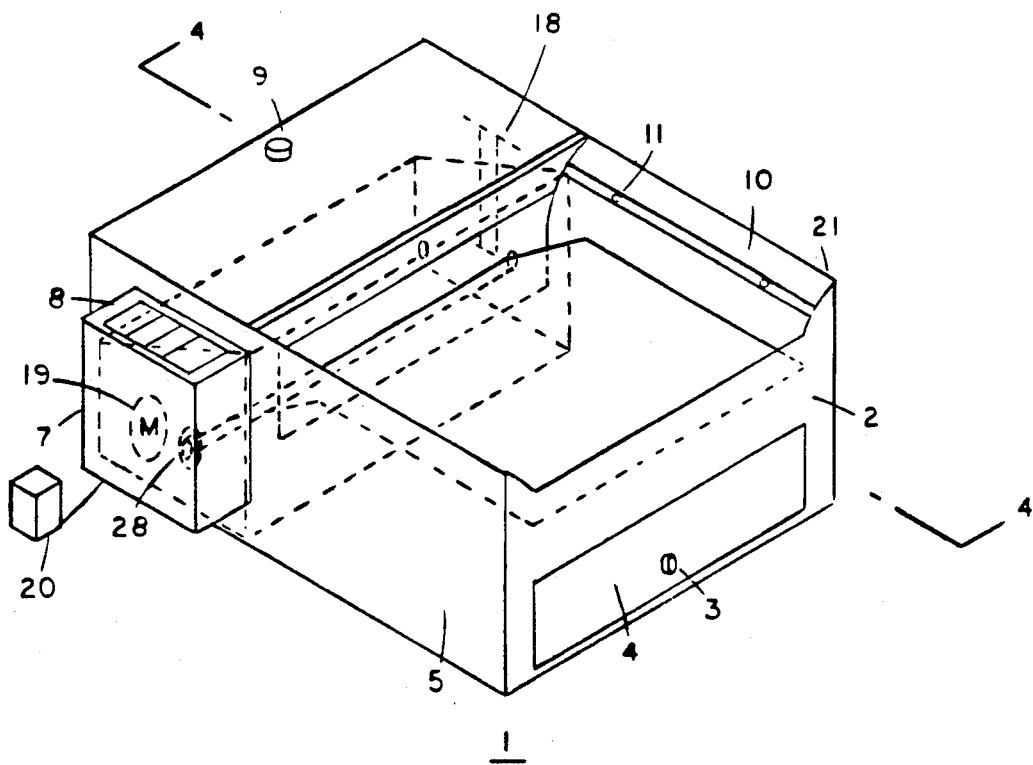

Apply power to the automatic litter box by plugging in the low voltage power supply 20 (FIG. 4a). With power on, touch the start button of the electronic control 8 and the motor 19 will engage the rotational device 28 and the starting layer 46 will begin to enter the disposable litter container 23 (FIG. 4b). When the starting layer 46 is taken in enough to expose its reflective material 41 the stop electronic sensor 14 will sense the reflective material 41 and stop the motor 19. The automatic litter box 1 is now ready for operation as shown (FIG. 4b).

Once a small animal enters the automatic litter box 1 the starting sensor 12 (FIG. 1a) energizes the time delay circuit located in the electronic compartment 6. The area of detection is limited to the distance from the starting sensor 12 to the inside wall of the front panel 2 to the inside wall of the left side panel 5 and the right side panel 21 at a height being from the starting sensor 12 to a distance of five inches above the top of the front panel 2, the left side panel 5 and the right side panel 21 (FIG. 1a).

While a small animal is in the range of detection the time delay relay will be energized to start the motor 19 in a specified time, only after no presence is detected.

When the time delay relay activates the motor 19 which in turn engages the rotational device 28 begins to remove the soiled litter layer (FIG. 4b). As the soiled layer enters the disposable litter container 23, the protective plastic extension layer 39 is being torn from the sealed plastic support 40 taking with it any soiled material. Deposits of solid waste along with soiled and clean litter fall to the bottom of the disposable litter container 23 and the soiled layer continues to wrap around the motorized rotational device 28 to form a tight sealed roll (FIG. 4b).

The next clean section 44 (FIG. 3c) uncovers the second section of fresh litter as it is taken into the disposable litter container 23. A reflective material 41 becomes exposed to the stop sensor 14 as it enters the through wall opening 13 of the automatic litter box 1 and the through wall opening 26 of the disposable litter container 23 causing the stop sensor 14 to activate the stop circuit (FIG. 4b). When the stop sensor 14 is activated it also energizes a counting circuit and displays the number of sections of fresh litter that remain to be used, and is located in the electronic controls 8 area (FIG. 1a).

The above sequence is repeated until the last section of soiled litter is deposited in the disposable litter container 23. When the last of the protective plastic extension layers 39 enters the through wall opening in panel 13 of the automatic litter box 1 and the through wall opening 26 of the disposable litter container 23, it exposes a reflective material 41 contained on the bottom of the litter compartment 15 which will activate the stop sensor 14 of the automatic litter box 1 (FIG. 1a).

To remove the disposable litter container 23 open the top hinged cover 9 of the automatic litter box 1 and move the disposable litter container 23 to the right to disengage the motor 19 and remove by lifting up using the carry handle 30 (FIG. 4b). Remove the top protective strips of the self adhesive strips 24 (FIG. 2a) and then sealing material 32 over the through wall opening in panel 13 and attach it to the self adhesive strips 24 thus sealing and containing the soiled litter in the disposable litter container 23.

I claim:

1. An automatic litter box comprising a litter compartment having a bottom panel, two opposing side walls and a pair of opposing end walls to form an open top litter compartment, a motor compartment is adjacently attached to said litter compartment, a disposable litter container is attached to said litter compartment and communicates with said motor compartment, a plurality of litter layers formed into a single litter sheet are positioned and foldedly stacked on top of each other in a zig-zag fashion within said litter compartment, and a distal end of said single sheet is rotationally joined to a motorized rotational device, wherein a motor within said motor compartment causes said rotational device to rotate and to cause one of said litter layers to slidably move into said disposable litter container.

2. The litter box of claim 1 wherein adjacently attached litter layers include a reflective area to activate a stop sensor.

3. The litter box of claim 1 wherein said disposable litter container houses said rotational device on which said litter sheet is rotatably collected.

4. The litter box of claim 1 wherein said disposable litter compartment is removably attached to said compartment.

* * * * *